United States Patent [19]
Riew

[11] 4,133,957
[45] Jan. 9, 1979

[54] AMINE-TERMINATED LIQUID POLYMERS AND PROCESS FOR PREPARATION THEREOF

[75] Inventor: Changkiu K. Riew, Akron, Ohio

[73] Assignee: The B. F. Goodrich Company, Akron, Ohio

[21] Appl. No.: 752,706

[22] Filed: Dec. 20, 1976

Related U.S. Application Data

[63] Continuation-in-part of Ser. No. 586,723, Jun. 13, 1975, abandoned.

[51] Int. Cl.² .......................................... C07D 295/12
[52] U.S. Cl. ............................... 544/357; 260/308 R; 260/561 A; 260/558 A; 260/559 A; 546/189; 546/190
[58] Field of Search ................... 260/268 PC, 293.63, 260/293.64, 308 R, 561 A, 558 A, 559 A; 544/357

[56] References Cited

U.S. PATENT DOCUMENTS

| | | | |
|---|---|---|---|
| 3,285,949 | 11/1966 | Siebert | 260/775 CR |
| 3,823,107 | 7/1974 | Cotton | 260/23.7 N |

*Primary Examiner*—Jose Tovar
*Attorney, Agent, or Firm*—Charles A. Crehore

[57] ABSTRACT

Amine-terminated liquid polymers are prepared by reacting a carboxyl-terminated, ester-terminated or acid chloride-terminated liquid polymer having a carbon-carbon backbone with at least one aliphatic, alicyclic, heterocyclic or aromatic amine containing at least two secondary or mixed primary/secondary amine groups, but no more than one primary amine group per molecule. The novel amine-terminated polymers are useful as elastic vulcanizates, polymeric cure agents, tougheners and flexibilizers for epoxy resins, in paints and coatings, in sealants and adhesives, and the like.

24 Claims, No Drawings

AMINE-TERMINATED LIQUID POLYMERS AND PROCESS FOR PREPARATION THEREOF

CROSS REFERENCE TO RELATED APPLICATION

This is a continuation-in-part of my co-pending U.S. patent application Ser. No. 586,723 filed June 13, 1975 now abandoned.

BACKGROUND OF THE INVENTION

U.S. Pat. No. 3,823,107 teaches reaction of diprimary amines, epoxy resins and functionally-terminated polymers in varying orders. It has been found that reaction of a diprimary amine (A) with a carboxyl-terminated liquid polymer (P) produces high levels of mixed reaction products, including carboxyl-terminated compounds having the formula P—A—P; compounds containing one terminal carboxyl group and one terminal amine group and having the formula P—A; amine-terminated compounds having the formula A—P—A; and polycondensation products such as P-(-A—P)$_n$, (P—A)$_n$ and A-(-P—A)$_n$ where n is a repeating chain sequence greater than 1. In each case the P—A bond is an amide group resulting from reaction of a primary amine group and a carboxyl group. Such mixed reaction products are often solids and difficult to use with uniform results in subsequent reactions, e.g., with epoxy resins. See Flory, *Principles of Polymer Chemistry*, Cornell University Press, 1953, chapters 3 and 8, and particularly pp. 318 to 324 for discussion of product distributions in condensation polymers.

New substantially pure amine-terminated liquid polymers are desired.

DETAILED DESCRIPTION

By the process of this invention, amine-terminated liquid polymers can be produced containing substantially fewer by-products than the mixed products of the prior art, provided that amines used in preparing the amine-terminated liquid polymers contain no more than one primary amine group per amine molecule. The amine-terminated liquid polymers of this invention have the formula

wherein Y is a univalent radical obtained by removing a hydrogen from an amine group of an aliphatic, alicyclic, heterocyclic or aromatic amine containing at least two secondary or mixed primary/secondary amine groups, but no more than one primary amine group per molecule. B is a polymeric backbone comprising carbon-carbon linkages. Generally the carbon-carbon linkages comprise at least about 95% by weight of total polymeric backbone weight, more preferably about 100% by weight of total polymeric backbone weight. The amine-terminated liquid polymers contain an average from about 1.5 to about 4 primary and/or secondary amine groups per molecule, more preferably from about 1.7 to about 3 primary and/or secondary amine groups per molecule. The amine-terminated liquid polymers may have Brookfield viscosities (measured using a Brookfield RVT viscometer at 27° C.) from about 500 cps to about 2,500,000 cps, more preferably from about 500 cps to about 1,200,000 cps. The amine-terminated liquid polymers may have amine equivalent weights (gram molecular weight per primary and/or secondary amine group, but exclusive of tertiary amine groups) from about 300 to about 4,000, more preferably from about 600 to about 3,000.

The amine-terminated liquid polymers can be prepared easily by reacting a carboxyl-terminated, ester-terminated or acid chloride-terminated liquid polymer having a carbon-carbon backbone with at least one aliphatic, alicyclic, heterocyclic or aromatic amine containing at least two secondary or mixed primary/secondary amine groups, but no more than one primary amine group per molecule.

The carboxyl-terminated liquid polymers used may have Brookfield viscosities from about 500 cps. to about 2,500,000 cps., more preferably from about 500 cps to about 1,200,000 cps., and have polymeric backbones comprising carbon-carbon linkages. The carboxyl-terminated liquid polymers may have carboxyl equivalent weights (gram molecular weight per carboxyl group) from about 300 to about 4,000, more preferably from about 600 to about 3,000. The carboxyl functional groups are located at least at the ends of a polymer molecule, but there may also be additional group(s) located pendant to a polymer backbone. The average number of total carboxyl groups typically may be from about 1.5 to about 4 groups per molecule, more preferably from about 1.7 to 3 groups per molecule.

Carboxyl-terminated liquid polymers having carbon-carbon backbone linkages may contain polymerized units of at least one vinylidene monomer having at least one terminal $CH_2\!=\!C<$ group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 atoms such as vinyl methyl ether, allyl methyl ether, and the like; and (e) acrylic acids and acrylates having the formula

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 2 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like. Often two or more types of these polymerized monomeric units are contained in the polymeric backbone.

More preferred liquid polymers contain polymerized units of at least one vinylidene monomer having at least one terminal $CH_2=C<$ group and are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (e) acrylic acids and acrylates having the formula

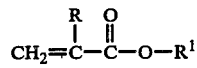

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 3 carbon atoms. Excellent results were obtained with dienes containing 4 to 10 carbon atoms, more preferably 4 to 8 carbon atoms.

The vinylidene monomers described above may be polymerized readily with from 0% up to about 50% by weight, more preferably from 0% up to about 35% by weight, of at least one comonomer selected from the group consisting of (f) vinyl aromatics having the formula

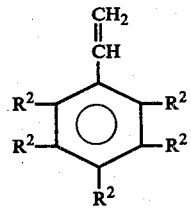

wherein $R^2$ is hydrogen, halogen or an alkyl radical containing from 1 to 4 carbon atoms, such as styrene, α-methyl styrene, chlorostyrene, vinyl toluene, and the like; (g) vinyl nitriles having the formula

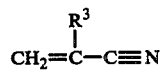

wherein $R^3$ is hydrogen or an alkyl radical containing 1 to 3 carbon atoms, such as acrylonitrile, methacrylonitrile and the like; (h) divinyls and diacrylates such as divinyl benzene, divinyl ether, diethylene glycol diacrylate, and the like; (i) amides of α,β-olefinically unsaturated carboxylic acids containing 2 to 8 carbon atoms such as acrylamide and the like; and (j) allyl alcohol and the like. Liquid polymer compositions comprising polymerized units of a major amount of at least one vinylidene monomer listed in (a) to (e) with a minor amount of at least one comonomer listed in (f) to (j) are within the scope of this invention.

More preferred comonomers may be selected from the group consisting of (f) vinyl aromatics having the formula

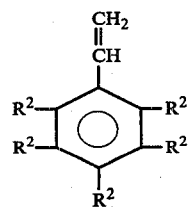

wherein $R^2$ is selected from the group consisting of hydrogen, and alkyl radicals containing 1 to 4 carbon atoms; and (g) vinyl nitriles having the formula

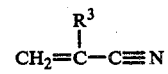

wherein $R^3$ is hydrogen or an alkyl radical containing 1 to 3 carbon atoms. Excellent results were obtained using styrene and acrylonitrile.

Examples of useful liquid polymeric backbones comprising carbon-carbon linkages include polyethylene, polyisobutylene, polyisoprene, polybutadiene, poly(vinyl ethyl ether), poly(ethylacrylate) and poly(butylacrylate) as well as copolymers of butadiene and acrylonitrile; butadiene and styrene; vinyl acetate and isoprene; vinyl ethyl ether and diallyl ether; vinyl ethyl ether and α-methyl styrene; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate and acrylic acid; ethyl acrylate and acrylamide; ethyl acrylate and allyl alcohol; butyl acrylate, styrene and isoprene; butyl acrylate and styrene; butyl acrylate and acrylonitrile; and the like.

Liquid carboxyl-terminated polymers may be prepared by free-radical polymerization using carboxyl-containing initiators and/or modifiers as disclosed in U.S. Pat. No. 3,285,949 and German Pat. No. 1,150,205 and by solution polymerization using lithium metal or organometallic compounds and post-treating the polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from liquid hydroxyl-terminated polymers by reaction with dicarboxylic acids or their anhydrides. Liquid halogen-terminated polymers can be reacted with unsaturated anhydrides in the presence of Lewis acids to yield carboxyl groups. Thus, it is seen that the method of preparing the liquid carboxyl-terminated polymer is not critical to the invention. The essential features of the polymer are that it have at least terminal carboxyl groups and a polymeric backbone of carbon-carbon linkages.

Examples of preferred liquid carboxyl-terminated polymers include carboxyl-terminated polyethylene, carboxyl-terminated polyisobutylene, carboxyl-terminated polybutadiene, carboxyl-terminated polyisoprene, carboxyl-terminated poly(ethylacrylate), as well as carboxyl-terminated copolymers of butadiene and acrylonitrile and butadiene and styrene. Carboxyl-terminated copolymers of butadiene with acrylonitrile or styrene were found to be especially useful. These polymers may contain from about 50% to about 99% by weight of butadiene, from about 0% to about 40% by weight of acrylonitrile or styrene and from about 1% to about 15% by weight of carboxyl, based upon the total weight of polymer.

The carboxyl-terminated liquid polymers can be esterified with an aliphatic monohydric alcohol by methods well known to the art in order to produce ester-terminated liquid polymers. For example, a carboxyl-terminated polymer and an aliphatic monohydric alcohol can be reacted under reflux in the presence of a small amount of an acid catalyst. Suitable acid catalysts include organic acids such as monoesters and diesters of orthophosphoric acid, alkarylsulfonic acids such as p-toluenesulfonic acid, and the like; inorganic acids such as boric acid, hydrochloric acid, phosphoric acid, sulfuric acid and the like; and Lewis acids such as tetraisopropyl titanate and the like. The amount of acid catalyst used may be as little as about 0.01% up to about 5% by weight based upon total reactant weight. Suitable aliphatic monohydric alcohols for use in the esterification reaction contain from 1 to 12 carbon atoms, more preferably from 1 to 6 carbon atoms, and have boiling points below about 150° C., more preferably below about 100° C. Primary aliphatic monohydric alcohols are preferred. Examples of suitable aliphatic monohydric alcohols include alkanols containing from 1 to 6 carbon atoms, such as methanol, ethanol, 1-propanol, 1-butanol 1-pentanol, and the like. Other suitable aliphatic monohydric alcohols include 2-methoxyethanol, 2-ethoxyethanol and the like. Excellent results may be obtained using ethanol, 1-propanol or 1-butanol. Excellent results may also be obtained using methanolic or ethanolic diazomethane.

The carboxyl-terminated liquid polymers can be converted to acid chloride-terminated liquid polymers by methods well known to the art. For example, a carboxyl-terminated polymer can be reacted with thionyl chloride to produce an acid chloride-terminated polymer. HCl and SO₂ are evolved primarily as gases and are separated easily from the acid chloride-terminated polymer, and any excess thionyl chloride can be removed easily by vacuum distillation or by washing with a solvent such as dry methyl ethyl ketone or benzene. Other suitable but less preferred acylation agents include phosphorus trichloride and phosphorus pentachloride.

Amines which react well with the carboxyl-terminated, ester-terminated and acid chloride-terminated polymers described heretofore include aliphatic amines containing from 2 to 20 carbon atoms, more preferably from 2 to 12 carbon atoms, and at least two, more preferably two, secondary amine groups or mixed primary/secondary amine groups, but no more than one primary amine group per molecule. Also suitable are alicyclic amines containing from 4 to 20 carbon atoms, more preferably from 4 to 12 carbon atoms, and at least two, more preferably two, secondary amine groups or mixed primary/secondary amine groups, but no more than one primary amine group per molecule. Heterocyclic amines may also be used which contain from 2 to 20 carbon atoms, more preferably from 2 to 12 carbon atom, and at least two, more preferably two, secondary amine groups or mixed primary/secondary amine groups, but no more than one primary amine group per molecule. Also suitable are aromatic amines containing from 7 to 20 carbon atoms, more preferably from 7 to 14 carbon atoms, and at least two, more preferably two, secondary amine groups or mixed primary/secondary amine groups, but not more than one primary amine group per molecule.

Examples of suitable amines just described include aliphatic amines such as N-methyl-1,3-propanediamine and the like. Also useful are heterocyclic diamines and polyamines such as 3-amino-1,2,4-triazole, 4,4'-trimethylenedipiperidine, 4-(aminomethyl)piperidine, piperazine, and N-(aminoalkyl) piperazines wherein each alkyl group contains from 1 to 12 carbon atoms, more preferably 1 to 6 carbon atoms, such as N-(2-aminoethyl)piperazine, N-(3-aminopropyl) piperazine, and the like. Useful aromatic amines include N-phenyl-o-phenylenediamine, N-phenylethylenediamine, and the like.

Even more preferred are amines containing one primary amine group and one secondary amine group. Primary and secondary amine groups have different reactivities with a given carboxyl-terminated, ester-terminated or acid chloride-terminated liquid polymer described heretofore. Therefore, the presence of such amine groups having different reactivities makes the amine-termination reaction more likely than coupling of the liquid polymers by the diamine, and a smaller amine excess may be used than would otherwise be needed in order to avoid coupling. Examples of more preferred amines just described include aliphatic amines such as N-methyl-1,3-propanediamine and the like; and heterocyclic diamines such as 3-amino-1,2,4-triazole, 4-(aminomethyl) piperidine, and N-(aminoalkyl) piperazines wherein each alkyl group contains from 1 to 12 carbon atoms, more preferably 1 to 6 carbon atoms, such as N-(2-aminoethyl)piperazine, N-(3-aminopropyl) piperazine, and the like. Other more preferred amines include aromatic diamines such as N-phenyl-o-phenylenediamine, N-phenylethylenediamine, and the like. Excellent results were obtained using N-methyl-1,3-propanediamine, 4-(aminomethyl) piperidine, and N-(2-aminoethyl) piperazine.

Use of amines containing more than one primary amine group per molecule has been found to produce high levels of mixed reaction products. Interactions between such mixed reaction products, as well as the presence of undefined polycondensation products, tend to cause solid reaction product masses instead of the desired amine-terminated liquid polymers. Of course, the reaction also may be difficult to control, and polymeric molecular weight also may be undesirably high. Examples of such amines containing more than one primary amine group per molecule include diprimary amines such as 1,6-diaminohexane, diethylenetriamine and the like.

A solvent is not required for the amine-termination reaction but may be used. Mixtures of solvents may also be used. Suitable solvents include aliphatic and cycloaliphatic ethers containing from 3 to 10 carbon atoms, more preferably from 3 to 6 carbon atoms, such as tetrahydrofuran, diethylether and the like; and esters containing from 3 to 10 carbon atoms, more preferably from 3 to 6 carbon atoms, such as ethyl acetate, n-butyl acetate, hexyl acetate, benzyl acetate, methyl propionate, ethyl propionate and the like. Also suitable as solvents and more preferred are aromatic compounds having the formula

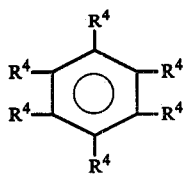

wherein $R^4$ is hydrogen, or an alkyl radical containing 1 to 3 carbon atoms, and at least two $R^4$s are hydrogen. More preferably $R^4$ is hydrogen, or an alkyl radical containing 1 to 2 carbon atoms, and at least three $R^4$s are hydrogen. Suitable aromatic solvents include benzene, toluene, o-, m- and p-xylene, o-, m- and p-diethylbenzene, cumene, mesitylene and the like.

A sufficient quantity of at least one amine described heretofore may be reacted with a carboxyl-terminated, ester-terminated or acid chloride-terminated liquid polymer described heretofore in order to produce an amine-terminated liquid polymer containing from about 1.5 to about 4 primary and/or secondary amine groups per molecule. Typically the average number of total carboxyl, ester or acid chloride groups in a liquid polymer before reaction will be from about 1.5 to about 4 groups per molecule, more preferably from about 1.7 to about 3 groups per molecule. In this typical case, from about 1.2 to about 6 moles, more preferably from about 1.2 to about 3 moles, of at least one amine described heretofore can be used per equivalent of carboxyl- ester- or acid chloride-terminated liquid polymer described heretofore. Larger amine amounts than 6 moles per equivalent of carboxylated, esterified or acid chloride-terminated liquid polymer make purification (i.e., removal of unreacted amine) of the amine-terminated liquid polymer more difficult. Moreover, if the amine-terminated liquid polymer is not purified to remove most of the unreacted amine, polymeric shelf stability may be affected adversely if the amine forms salt, gel particles and/or a layer of oxidized amine scum. In any case, when the carboxy— ester or acid chloride-terminated liquid polymer also contains polymerized therein appreciable amounts of acrylic acid, acrylates or the like, the amount of amine reacted should be limited so that the amine-terminated liquid polymer contains no more than an average of 1.5 to about 4 primary and/or secondary amine groups per molecule.

No catalyst is required, and many types of mixing apparatus can be used in the amine termination reaction. For example, simple mixers can be used, including turbine stirrers as well as propeller mixers. Reaction components can be combined in any order. The reaction mixture may be heated (or refluxed if a solvent is used) at a temperature from about 80° C. to about 200° C., until more than 90% of carboxyl, ester or acid chloride groups have reacted with the amines, i.e., until the amidation reaction is more than 90% complete. Reaction time is typically about 1 to 120 hours. Byproducts may be removed by evaporation or the like as they are formed (e.g., water from the carboxyl-amine reaction, HCl from the acid chloride-amine reaction, and alcohol from the ester-amine reaction). The amine-terminated liquid polymer may be purified by vacuum distillation or by washing with a solvent such as a benzene-methanol mixture in order to remove the unreacted amine, followed by drying the polymer. The structure of amide formed during preparation of the amine-terminated liquid polymers can be determined by infrared spectroscopy. Amine value can be analyzed quantitatively following the procedure described by Siggia, *Quantitative Organic Analysis via Functional Groups,* N.Y., Wiley and Sons, Inc., 1963, pp. 452–456, using a toluene/isopropanol solvent mixture instead of Siggia's ethylene glycol/isopropanol mixture.

The following examples illustrate the present invention more fully.

EXAMPLES 1–14

The following examples 1–14 demonstrate preparation of amine-terminated liquid polymers from carboxyl-terminated butadiene-acrylonitrile, butadiene-styrene or butadiene-acrylonitrile-acrylic acid liquid polymers. The carboxyl-terminated liquid polymers were prepared according to the method of U.S. Pat. No. 3,285,949. The amount of N-(2-aminoethyl)piperazine required to react with a given amount of a carboxyl-terminated liquid polymer was calculated using the formula:

$$\frac{(Ephr_{COOH}) \times (Mol. Wt._{AEP}) \times \left(\frac{AEP}{CTP} \text{ Ratio}\right) \times (Wt._{CTP})}{100}$$

where $Ephr_{COOH}$ = carboxyl equivalent weight per hundred parts of carboxyl-terminated liquid polymer;

Mol. Wt.$_{AEP}$ = molecular weight of N-(2-aminoethyl)piperazine, i.e. 129;

$\frac{AEP}{CTP}$ Ratio = desired ratio of moles of N-(2-aminoethyl)piperazine (AEP) to equivalents of carboxyl-terminated liquid polymer (CTP); and Wt.$_{CTP}$ = weight grams of carboxyl-terminated liquid polymer (CTP).

In each example 1–14 a 2-liter, 4-necked glass flask was cleaned thoroughly with soap and water, rinsed first with water and then with acetone, and flushed with nitrogen until dry. The flask was equipped with an air stirrer, thermocouple, nitrogen inlet tube, and Dean-Stark water trap with water condenser. A carboxyl-terminated liquid polymer and N-(2-aminoethyl)piperazine were charged to the flask with stirring, and the reaction mixture was heated to about 120° C. to 130° C. using an oil bath. The flask was purged continuously with nitrogen during reaction. After final $Ephr_{COOH}$ of the reaction mixture was reduced to less than 10% of the initial $Ephr_{COOH}$, the gas inlet tube was replaced by a stopper, and the water condenser was connected to a vacuum pump. A vacuum (about 1 to 2 mm Hg) was drawn on the flask and maintained for about 2 hours in order to remove some excess N-(2-aminoethyl) piperazine and other volatiles. Brookfield viscosity in each example was measured at 27° C. using a Brookfield RVT viscometer and #4 spindle. Data is set forth in Table I.

TABLE I

| | Carboxyl-terminated Liquid Polymer | | | | | N-(2-aminoethyl)piperazine | | Amine-Terminated Liquid |
|---|---|---|---|---|---|---|---|---|
| Ex. | Wt. (grams) | Ephr$_{COOH}$* | Brookfield Viscosity (cps.) | Acrylonitrile (Wt. %) | Styrene (Wt. %) | Wt. (grams) | AEP/CTP Ratio*** | Polymer-Brookfield Viscosity (cps.) |
| 1 | 1000.4 | 0.044 | 43,000 at 27° C | 0 | 0 | 85.2 | 1.5 | 244,000 at 27° C |
| 2 | 1000 | 0.044 | 44,200 at 27° C | 0 | 0 | 170.3 | 3.0 | 76,500 at 27° C |
| 3 | 1000 | 0.047 | 65,400 at 24° C | 0 | 0 | 121.3 | 2.0 | 290,000 at 24° C |
| 4 | 1000 | 0.047 | 65,600 at 22° C | 0 | 0 | 181.4 | 3.0 | 194,000 at 22° C |
| 5 | 8250 | 0.043 | 61,200 at 22° C | 0 | 0 | 1373 | 3.0 | 187,000 at 22° C |
| 6 | 1000 | 0.053 | 75,000 at 23° C | 9.9 | 0 | 205.1 | 3.0 | 89,000 at 23° C |
| 7 | 940 | 0.053 | 75,000 at 22° C | 9.9 | 0 | 192.8 | 3.0 | 150,000 at 22° C |
| 8 | 1001.4 | 0.054 | 191,000 at 23° C | 18.1 | 0 | 209.3 | 3.0 | 320,000 at 23° C |
| 9 | 1000 | 0.052 | 177,000 at 23° C | 18.2 | 0 | 201.2 | 3.0 | 187,000 at 23° C |
| 10 | 1001.1 | 0.056 | 1,320,000 at 22° C | 26.5 | 0 | 108.5 | 1.5 | >2,000,000 at 22° C |
| 11 | 1603 | 0.056 | 1,320,000 at 22° C | 26.5 | 0 | 217.4 | 3.0 | 1,008,000 at 22° C |
| 12 | 1200 | 0.056 | 1,320,000 at 22° C | 26.5 | 0 | 260 | 3.0 | 870,000 at 22° C |
| 13** | 1005 | 0.068 | 244,400 at 22° C | 17.5 | 0 | 132.2 | 1.5 | 802,000 at 22° C |
| 14 | 1000 | 0.05 | 850,000 at 21° C | 0 | 20 | 181.9 | 2.8 | >2,000,000 at 21° C |

*Carboxyl equivalent weight per hundred weight parts of carboxyl-terminated liquid polymer.
**Carboxyl-terminated terpolymer of butadiene, acrylonitrile and acrylic acid
***AEP/CTP Ratio = desired ratio of moles of N-(2-aminoethyl)piperazine (AEP) to equivalents of carboxyl-terminated liquid polymer (CTP).

Several amine-terminated liquid polymers were analyzed by infrared spectroscopy. Carboxyl carbonyl bands at 1710 cm$^{-1}$ and 1745 cm$^{-1}$ were completely absent. Amide carbonyl bands were present at 1530 cm$^{-1}$ and 1675 cm$^{-1}$.

A number of amine-terminated liquid polymers like those in Table I were analyzed by potentiometric titration according to the modified Siggia procedure described heretofore. Ephr$_{AMINE}$ may be defined as primary and/or secondary amine equivalent weight (exclusive of tertiary amine content) per hundred weight parts of amine-terminated liquid polymer. The Ephr$_{AMINE}$ ranged from about 0.04 to about 0.2 depending upon residual N-(2-aminoethyl)piperazine content. The infrared spectra and potentiometric titration data, as well as nuclear magnetic resonance spectra, indicated that carboxyl groups of carboxyl-terminated liquid polymers reacted mainly with the primary amine group of N-(2-aminoethyl) piperazine to produce amine-terminated liquid polymers having mainly free secondary amine groups.

EXAMPLE 15

Example 15 demonstrates again the preparation of an amine-terminated liquid polymer from N-(2-aminoethyl)piperazine and a carboxyl-terminated butadiene acrylonitrile liquid polymer. The carboxyl-terminated liquid polymer was prepared according to the method of U.S. Pat. No. 3,285,949 and was found to have a Brookfield viscosity at 27° C. of 106,000 cps., and Ephr$_{COOH}$ of 0.052 a carboxyl equivalent weight of 1923, and an acrylonitrile content of 16.0 wt.%. The amount of N-(2-aminoethyl)piperazine required to react with a given amount of the carboxyl-terminated liquid polymer was calculated using the formula described for examples 1–14.

A 2-liter, 4-necked glass flask was cleaned thoroughly with soap and water, rinsed first with water and then with acetone, and flushed with nitrogen until dry. The flask was equipped with an air stirrer, thermocouple, nitrogen inlet tube, and Dean-Stark water trap with water condenser.

1000 grams (0.52 equivalent) of the carboxyl-terminated liquid polymer and 134.4 grams (1.04 moles) of N-(2-aminoethyl)piperazine were charged to the flask with stirring, and the reaction mixture was heated to about 130° C. using an oil bath. The flask was purged continuously with nitrogen during reaction. Reaction was continued for 12 hours at 130° C., and subsequently vacuum dried for 7 hours at 1 mm Hg and 130° C.

An amine-terminated liquid polymer was produced having a Brookfield viscosity at 27° C. of 515,000 cps. The liquid polymer was found by potentiometric titration to have undergone 100% conversion and to have an Ephr$_{AMINE}$ of 0.0496, a residual N-(2-aminoethyl)piperazine content of 0.03 wt.%, and an amine equivalent weight of 2016.

EXAMPLE 16

Example 16 demonstrates preparation of an amine-terminated liquid polymer from N-methyl-1,3-propanediamine and a carboxyl-terminated butadiene-acrylonitrile liquid polymer. The carboxyl-terminated liquid polymer was prepared according to the method of U.S. Pat. No. 3,285,949 and was found to have a Brookfield viscosity at 27° C. of 128,000 cps., and Ephr$_{COOH}$ of 0.056, a carboxyl equivalent weight of 1786, and an acrylonitrile content of 16.1 wt.%. The amount of N-methyl-1,3-propanediamine required to react with a given amount of the carboxyl-terminated liquid polymer was calculated using the formula described for examples 1–14, with N-methyl-1,3-propanediamine substituted for N-(2-aminoethyl) piperazine.

A 2-liter, 4-necked glass flask was cleaned thoroughly with soap and water, rinsed first with water and then with acetone, and flushed with nitrogen until dry. The flask was equipped with an air stirrer, thermocouple, nitrogen inlet tube, and Dean-Stark water trap with water condenser.

1000g (0.56 equivalent) of the carboxyl-terminated liquid polymer and 99 grams (1.12 moles) of N-methyl-1,3-propanediamine were charged to the flask with stirring, and the reaction mixture was heated to about 130° C. using an oil bath. The flask was purged continuously with nitrogen during reaction. Reaction was continued for 51 hours at 130° C. and 54 hours at 150° C., for a total reaction time of 105 hours.

An amine-terminated liquid polymer was produced having a Brookfield viscosity of 27° C. of 1,000,000 cps. The liquid polymer was found by potentiometric titration to have undergone 100% conversion and to have an Ephr$_{AMINE}$ of 0.0745, a residual N-methyl-1,3-propanediamine content of 0.823 wt.%., and an amine equivalent weight of 1340. After vacuum drying, the liquid polymer was found to have an Ephr$_{AMINE}$ equivalent weight of 1776. An infrared spectrum was obtained having broad amide carbonyl bands at 1640–1675 cm$^{-1}$, indicating that primary as well as secondary amine groups of N-methyl-1,3-propanediamine reacted with carboxyl groups of the carboxyl-terminated liquid polymer to produce an amine-terminated liquid polymer.

EXAMPLE 17

Example 17 demonstrates preparation of an amine-terminated liquid polymer from 4,4'-trimethylenedipiperidine and a carboxyl-terminated butadiene-acrylonitrile liquid polymer. The carboxyl-terminated liquid polymer was prepared according to the method of U.S. Pat. No. 3,285,949 and was found to have a Brookfield viscosity at 27° C. of 128,000 cps., an Ephr$_{COOH}$ of 0.056, a carboxyl equivalent weight of 1786, and an acrylonitrile content of 16.1 wt.%. The amount of 4,4'-trimethylenedipiperidine required to react with a given amount of the carboxyl-terminated liquid polymer was calculated using the formula described for examples 1–14, with 4,4'-trimethylenedipiperidine substituted for N-(2-aminoethyl)piperazine.

A 2-liter, 4-necked glass flask was cleaned thoroughly with soap and water, rinsed first with water and then with acetone and flushed with nitrogen until dry. The flask was equipped with an air stirrer, thermocouple, nitrogen inlet tube, and Dean-Stark water trap with water condenser.

1000g. (0.56 equivalent) of the carboxyl-terminated liquid polymer and 236 grams (1.12 moles) of 4,4'-trimethylenedipiperidine were charged to the flask with stirring, and the reaction mixture was heated to about 130° C. using an oil bath. The flask was purged continuously with nitrogen during reaction. Reaction was continued for 5 hours at 130° C., 19 hours at 140° C., 4 hours at 150° C., 3 hours at 180° C., 16 hours at 150° C., and 8 hours at 180° C., for a total of 55 hours.

An amine-terminated liquid polymer was produced having a Brookfield viscosity at 27° C. of 445,000 cps. The liquid polymer was found by potentiometric titration to have undergone 100% converstion and to have an Ephr$_{AMINE}$ of 0.1245, a residual 4,4'-trimethylenedipiperidine content of 8.55 wt.% and an amine equivalent weight of 803. After vacuum drying, the liquid polymer was found to have an Ephr$_{AMINE}$ of 0.0473 and an amine equivalent weight of 2114. An infrared spectrum was obtained having an amide carbonyl band at 1648 cm$^{-1}$, indicating that secondary amine groups of 4,4'-trimethylenedipiperidine reacted with carboxyl groups of the carboxyl-terminated liquid polymer to produce an amine-terminated liquid polymer.

EXAMPLE 18

Example 18 demonstrates preparation of an amine-terminated liquid polymer from 4-(aminomethyl)piperidine and a carboxyl-terminated butadiene-acrylonitrile liquid polymer. The carboxyl-terminated liquid polymer was prepared according to the method of U.S. Pat. No. 3,285,949 and was found to have a Brookfield viscosity at 27° C. of 128,000 cps., an Ephr$_{COOH}$ of 0.056, a carboxyl equivalent weight of 1786, and an acrylonitrile content of 16.1 wt.%. The amount of 4-(aminomethyl)piperidine required to react with a given amount of the carboxyl-terminated liquid polymer was calculated using the formula described for examples 1–14, with 4-(aminomethyl)piperidine substituted for N-(2-aminoethyl)piperazine.

A 2-liter, 4-necked glass flask was cleaned thoroughly with soap and water, rinsed first with water and then with acetone and flushed with nitrogen until dry. The flask was equipped with an air stirrer, thermocouple, nitrogen inlet tube, and Dean-Stark water trap with water condenser.

1000g (0.56 equivalent) of the carboxyl-terminated liquid polymer and 128 grams (1.12 moles) of 4-(aminomethyl)piperidine were charged to the flask with stirring, and the reaction mixture was heated to about 130° C. using an oil bath. The flask was purged continuously with nitrogen during reaction. Reaction was continued for 7 hours at 130° C. and 41 hours at 150° C., for a total of 48 hours.

An amine-terminated liquid polymer was produced having a Brookfield viscosity at 27° C. of 1,000,000 cps. The liquid polymer was found by potentiometric titration to have undergone 99.9% conversion and to have an Ephr$_{AMINE}$ of 0.1182, a residual 4-(aminomethyl)piperidine content of 3.69 wt.%, and an amine equivalent weight of 850. After vacuum drying, the liquid polymer was found to have an Ephr$_{AMINE}$ of 0.057 and amine equivalent weight of 1788. An infrared spectrum was obtained having broad amide carbonyl bands at 1640–1675 cm$^{-1}$, indicating that primary as well as secondary amine groups of 4-(aminomethyl)piperidine reacted with carboxyl groups of the carboxyl-terminated liquid polymer to produce an amine-terminated liquid polymer.

EXAMPLE 19

The diprimary amine diethylenetriamine was found to couple a carboxyl-terminated butadiene-acrylonitrile liquid polymer to such an uncontrollable extent that a rubbery solid product resulted rather than the desired liquid polymer. The carboxyl-terminated liquid polymer was prepared according to the method of U.S. Pat. No. 3,285,949 and was found to have a Brookfield viscosity at 27° C. of 106,000 cps., an Ephr$_{COOH}$ of 0.052, a carboxyl equivalent weight of 1923 and an acrylonitrile content of 16 wt.%. The amount of diethylenetriamine required to react with a given amount of the carboxyl-terminated liquid polymer was calculated using the formula described for examples 1–14, with diethylenetriamine substituted for N-(2-aminoethyl)piperazine.

A 2-liter, 4-necked glass flask was cleaned thoroughly with soap and water, rinsed first with water and then with acetone, and flushed with nitrogen until dry. The flask was equipped with an air stirrer, thermocouple, nitrogen inlet tube, and Dean-Stark water trap with water condenser.

1000 grams (0.52 equivalent) of the carboxyl-terminated liquid polymer and 107.3 grams (1.04 moles) of diethylenetriamine were charged to the flask with stirring, and the reaction mixture was heated to about 130° C. using an oil bath. The flask was purged continuously with nitrogen during reaction. Reaction was continued for 9 hours at 130° C., and the reaction mixture became too viscous to stir. A rubbery solid formed which neither melted at 180° C. nor dissolved in chloroform.

EXAMPLE 20

The diprimary amine 1,6-hexanediamine was found to couple a carboxyl-terminated butadiene-acrylonitrile liquid polymer to such an uncontrollable extent that a rubbery solid product resulted rather than the desired liquid polymer. The carboxyl-terminated liquid polymer was prepared according to the method of U.S. Pat. No. 3,285,949 and was found to have a Brookfield viscosity of 27° C. of 106,000 cps., an Ephr$_{COOH}$ of 0.052, a carboxyl equivalent weight of 1923, and an acrylonitrile content of 16 wt.%. The amount of 1,6-hexanediamine required to react with a given amount of the carboxyl-terminated liquid polymer was calculated using the formula described for examples 1-14, with 1,6-hexanediamine substituted for N-(2-aminoethyl) piperazine.

A 2-liter, 4-necked glass flask was cleaned thoroughly with soap and water, rinsed first with water and then with acetone, and flushed with nitrogen until dry. The flask was equipped with an air stirrer, thermocouple, nitrogen inlet tube, and Dean-Stark water trap with water condenser.

1000 grams (0.52 equivalent) of the carboxyl-terminated liquid polymer and 120.9 grams (1.04 moles) of 1,6-hexanediamine were charged to the flask with stirring, and the reaction mixture was heated to about 130° C. using an oil bath. The flask purged continuously with nitrogen during reaction. Reaction was continued for 37 hours at 130° C. Thereafter, the gas inlet tube was replaced by a stopper, and the water condenser was connected to a vacuum pump. A vacuum (about 1 mm Hg) was drawn on the flask and maintained with stirring in order to remove excess 1,6-hexanediamine and other volatiles. After about 3 hours of vacuum drying, the reaction mixture became too viscous to stir. A rubbery solid formed which swelled but did not dissolve in toluene.

The novel amine-terminated liquid polymers are useful as room-temperature cure agents for epoxy resins, as the major components in castable elastomeric systems, as tougheners for epoxy resins in structural plastics and the like. The amine-terminated liquid polymers are also useful in paints, coatings, sealants, adhesives, and the like.

I claim:

1. An amine-terminated liquid polymer containing an average from about 1.5 to about 4 amine groups per molecule, said groups being primary, secondary or a mixture thereof, and said polymer having the formula

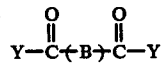

wherein Y is a univalent radical obtained by removing a hydrogen from an amine group of an aliphatic, alicyclic, heterocyclic or aromatic amine containing from 2 to 20 carbons and at least two secondary or mixed primary/secondary amine groups per amine molecule, but no more than one primary amine group per amine molecule, and B is a polymeric backbone containing carbon-carbon linkages comprising at least 95% of total polymeric backbone weight, said backbone B containing polymerized units of at least one vinylidene monomer having at least one terminal CH$_2$=C< group, said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

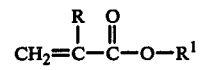

said R being hydrogen or an alkyl radical containing 1 to 3 carbon atoms, and said R$^1$ being hydrogen, an alkyl radical containing 1 to 18 carbon atoms, or an alkoxyalkyl, alkylthioalkyl or cyanoalkyl radical containing 2 to 12 carbon atoms.

2. A polymer of claim 1 wherein said carbon-carbon linkages comprise 100% by weight of total polymeric backbone weight, and said monomer is selected from the group consisting of (a) monoolefins containing 2 to 8 carbon atoms, (b) dienes containing 4 to 8 carbon atoms, and (e) acrylic acids and acrylates having the formula

said R being hydrogen or an alkyl radical containing 1 to 3 carbon atoms and said R$^1$ being hydrogen, an alkyl radical containing 1 to 8 carbon atoms, or an alkoxyalkyl, alkylthioalkyl or cyanoalkyl radical containing 2 to 3 carbon atoms.

3. A polymer of claim 2 wherein said amine is a heterocyclic amine containing from 2 to 20 carbon atoms.

4. A polymer of claim 3 wherein said vinylidene monomer contains copolymerized therewith up to about 50% by weight of a least one comonomer selected from the group consisting of (f) vinyl aromatics having the formula

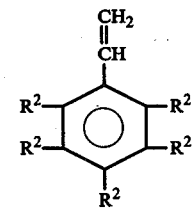

wherein R$^2$ is hydrogen, or an alkyl radical containing from 1 to 4 carbon atoms, (g) vinyl nitriles having the formula

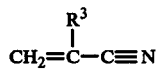

wherein R$^3$ is hydrogen or an alkyl radical containing 1 to 3 carbon atoms, (h) divinyls and diacrylates, (i) amides of α,β-olefinically unsaturated carboxylic acids containing 2 to 8 carbon atoms, and (j) allyl alcohol.

5. A polymer of claim 4 wherein said amine contains one primary and one secondary amine group per molecule, and said comonomer is selected from the group consisting of (f) said vinyl aromatics and (g) said vinyl nitriles.

6. A polymer of claim 5 wherein said amine is at least one N-(aminoalkyl)piperazine, each aminoalkyl group of said amine contains from 1 to 12 carbon atoms, said vinylidene monomer is at least one of said dienes, and said comonomer is at least one of said vinyl aromatics.

7. A polymer of claim 5 wherein said amine is N-(2-aminoethyl) piperazine, said vinylidene monomer is butadiene and said comonomer is styrene.

8. A polymer of claim 5 wherein said amine is at least one N-(aminoalkyl)piperazine, each aminoalkl group of said amine contains from 1 to 12 carbon atoms, said vinylidene monomer is at least one of said dienes, and said comonomer is at least one of said vinyl nitriles.

9. A polymer of claim 8 wherein said amine is N-(2-aminoethyl)piperazine, said vinylidene monomer is butadiene and said comonomer is acrylonitrile.

10. A polymer of claim 4 wherein said amine is a disecondary amine, 4,4'-trimethylene dipiperidine.

11. A polymer of claim 5 wherein said amine is N-methyl-1,3-propanediamine.

12. A polymer of claim 5 wherein said amine is 4-(aminomethyl)piperidine.

13. A process for preparing an amine-terminated liquid polymer containing an average from about 1.5 to about 4 amine groups per molecule, said amine groups being primary, secondary or a mixture thereof,
(1) said process comprising reacting (a) a carboxyl-terminated, ester-terminated or acid chloride-terminated liquid polymer with (b) at least one aliphatic, alicyclic, heterocyclic or aromatic amine containing from 2 to 20 carbon atoms and at least two secondary or mixed primary/secondary amine groups per amine molecule, but no more than one primary amine group per amine molecule, and
(2) said polymer having the formula

wherein Y is a univalent radical obtained by removing a hydrogen from a primary or secondary amine group of said amine, and B is a polymeric backbone containing carbon-carbon linkages comprising at least 95% of total polymeric backbone weight, said backbone B containing polymerized units of at least one vinylidene monomer having at least one terminal $CH_2=C<$ group, said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

said R being hydrogen or an alkyl radical containing 1 to 3 carbon atoms, and said $R^1$ being hydrogen, an alkyl radical containing 1 to 18 carbon atoms, or an alkoxyalkyl, alkylthioalkyl or cyanoalkyl radical containing 2 to 12 carbon atoms.

14. A process of claim 13 wherein said carbon-carbon linkages comprise 100% by weight of total polymeric backbone weight, and said monomer is selected from the group consisting of (a) monoolefins containing 2 to 8 carbon atoms, (b) dienes containing 4 to 8 carbon atoms, and (e) acrylic acids and acrylates having the formula

said R being hydrogen or an alkyl radical containing 1 to 3 carbon atoms and said $R^1$ being hydrogen, an alkyl radical containing 1 to 8 carbon atoms, or an alkoxyalkyl, alkylthioalkyl or cyanoalkyl radical containing 2 to 8 carbon atoms.

15. A process of claim 14 wherein said amine is a heterocyclic amine containing from 2 to 20 carbon atoms.

16. A process of claim 15 wherein said vinylidene monomer contains copolymerized therewith up to about 50% by weight of at least one comonomer selected from the group consisting of (f) vinyl aromatics having the formula

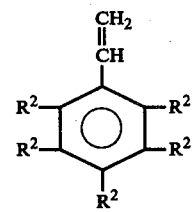

wherein $R^2$ is hydrogen, or an alkyl radical containing from 1 to 4 carbon atoms, (g) vinyl nitriles having the formula

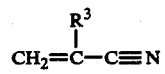

wherein $R^3$ is hydrogen or an alkyl radical containing 1 to 3 carbon atoms, (i) divinyls and diacrylates, (j) amides of a,b-olefinically unsaturated carboxylic acids containing 2 to 8 carbon atoms, and (j) allyl alcohol.

17. A process of claim 16 wherein said amine contains one primary and one secondary amine group per molecule, and said comonomer is selected from the group consisting of (f) said vinyl aromatics and (g) said vinyl nitriles.

18. A process of claim 17 wherein said amine is at least one N-(aminoalkyl)piperazine, each aminoalkyl group of said amine contains from 1 to 12 carbon atoms, said vinylidene monomer is at least one of said dienes, and said comonomer is at least one of said vinyl aromatics.

19. A process of claim 18 wherein said amine is N-(2-aminoethyl)piperazine, said vinylidene monomer is butadiene and said comonomer is styrene.

20. A process of claim 17 wherein said amine is at least one N-(aminoalkyl)piperazine, each aminoalkyl group of said amine contains from 1 to 12 carbon atoms, said vinylidene monomer is at least one of said dienes, and said comonomer is at least one of said vinyl nitriles.

21. A process of claim 20 wherein said amine is N-(2-aminoethyl)piperazine, said vinylidene monomer is butadiene and said comonomer is acrylonitrile.

22. A process of claim 16 wherein said amine is a disecondary amine, 4,4'-trimethylene dipiperidine.

23. A process of claim 17 wherein said amine is N-methyl-1,3-propanediamine.

24. A process of claim 17 wherein said amine is 4-(aminomethyl)piperidine.

* * * * *